(12) United States Patent
Meier et al.

(10) Patent No.: US 9,034,406 B2
(45) Date of Patent: May 19, 2015

(54) PRESERVING SEASONING FLAVOUR PROFILES DURING THE MANUFACTURING OF FOOD-SEASONING SHEETS

(71) Applicants: Hans J. Meier, Moncton (CA); Transform Pack Inc., Moncton (CA)

(72) Inventors: Hans J. Meier, Moncton (CA); Jeff Dude, Moncton (CA)

( * ) Notice: Subject to any disclaimer, the term of this patent is extended or adjusted under 35 U.S.C. 154(b) by 0 days.

(21) Appl. No.: 13/998,037

(22) Filed: Sep. 25, 2013

(65) Prior Publication Data

US 2015/0004292 A1    Jan. 1, 2015

Related U.S. Application Data

(62) Division of application No. 13/137,155, filed on Jul. 25, 2011, now Pat. No. 8,590,479.

(51) Int. Cl.
*A23P 1/08* (2006.01)
*A23L 1/22* (2006.01)

(52) U.S. Cl.
CPC ........... *A23L 1/2205* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 3,513,810 A | 5/1970 | Jackson | |
| 4,128,445 A | 12/1978 | Sturzenegger et al. | |
| 4,655,161 A | 4/1987 | Thompson | |
| 4,667,879 A | 5/1987 | Muller | |
| 5,061,399 A * | 10/1991 | Jenner et al. | 252/299.62 |
| 5,520,958 A | 5/1996 | Doesburg et al. | |
| 5,547,508 A * | 8/1996 | Affinito | 118/50 |
| 5,705,214 A * | 1/1998 | Ito et al. | 426/135 |
| 5,733,608 A | 3/1998 | Kessel et al. | |
| 6,146,690 A | 11/2000 | Kustermann | |
| 6,403,136 B1 | 6/2002 | Damm Bokobza | |
| 6,623,773 B2 | 9/2003 | Meier et al. | |
| 7,175,710 B2 | 2/2007 | Metzger et al. | |
| 2009/0274799 A1 | 11/2009 | Lee et al. | |
| 2010/0129507 A1 * | 5/2010 | Abu-Ali et al. | 426/292 |
| 2011/0212226 A1 * | 9/2011 | Soane et al. | 426/96 |
| 2012/0076921 A1 | 3/2012 | Myers et al. | |

FOREIGN PATENT DOCUMENTS

| | | |
|---|---|---|
| CA | 2007522 | 2/1991 |
| CA | 2049271 | 3/1992 |
| CA | 2271124 | 5/1998 |
| CA | 2278569 | 7/1998 |

* cited by examiner

*Primary Examiner* — Carolyn Paden
(74) *Attorney, Agent, or Firm* — Mario Theriault

(57) ABSTRACT

A method and an installation are provided for preserving desired seasoning flavour profiles during the manufacturing of food-seasoning sheets. The method includes the steps of; laying a thin layer of adhesive on a base sheet; removing air from the adhesive prior to the step of laying; reducing free moisture from the adhesive during the step of laying, and depositing food-seasoning ingredients onto the thin layer of adhesive. The installation for manufacturing food-seasoning sheets includes an adhesive dispenser having a reservoir and a delivery slot communicating with the reservoir for dispensing adhesive. The dispenser has a heating element mounted thereto for heating the adhesive. The adhesive is made under a partial vacuum and it is conveyed to the dispenser in a partial vacuum.

5 Claims, 5 Drawing Sheets

PRESERVING SEASONING FLAVOUR PROFILES DURING THE MANUFACTURING OF FOOD-SEASONING SHEETS

This is a divisional application of application Ser. No. 13/137,155 filed Jul. 25, 2011

FIELD OF THE INVENTION

This invention pertains to the manufacturing of food-seasoning sheets, and more particularly, it pertains to the calibration of ingredients in food-seasoning sheets.

BACKGROUND OF THE INVENTION

Packaging material for curing or marinating fresh food during storage has been part of the art for some time U.S. Pat. No. 6,623,773 for example, issued to Mr. Hans J. Meier, one of the inventors of the instant application, has been granted on Sep. 23, 2003. This document explains the composition of food-seasoning sheet products.

Other known documents describing similar sheet materials include:
U.S. Pat. No. 5,705,214 issued to T. Ito et al., on Jan. 6, 1998;
CA Patent 2,007,522 issued to T. Ito, et al., on Mar. 14, 2000;
US publ. 2009/0274799 published by R. V. Lee et al., on Nov. 5, 2009.

Referring back to the Meier patent, U.S. Pat. No. 6,623,773, which is incorporated herein by reference, it is explained therein that the calibration of seasoning ingredients bonded to a food-seasoning sheet is closely depending on the amount of adhesive that has been applied to the sheet. We might add that the calibration of seasoning ingredients in a food-seasoning sheet is also closely depending on the condition of the adhesive when seasoning ingredients are deposited over the sheet.

Spice products for example, are granular or powdery in nature and their adhesion to a food-seasoning sheet depends on the portion of each granule that sinks into the layer of adhesive. The thickness and surface tension of the adhesive layer are contributing factors in the ability to retain the spice product to a food-seasoning sheet. When the layer of adhesive is too shallow, the surface of the adhesive tends to dry up and to form a shell that does not retain powdery spice materials. A thicker layer of adhesive tends to remain more fluid and wet, and to completely encapsulate and/or dissolve spice particles. In some instances, a thicker layer of adhesive may hinder the release of the spice particles from the sheet and into the food to be marinated. Furthermore, the air and water content of the adhesive are contributing factors to cause more or less absorption of the seasoning ingredients into the adhesive and to modify the potency of these ingredients. Therefore, both the thickness of adhesive and the wetness of this adhesive are important factors to consider in the manufacturing a high quality food-seasoning sheets.

For example, it is well known that HVP's (hydrolyzed vegetable proteins) and sucrose are very moisture-sensitive elements that have the ability to extract moisture from a substrate. This makes these elements very difficult to work with without losing their effectiveness.

The type of adhesive that is used in these applications has a viscous structure. When such an adhesive is discharged from a slot die for example, it may have a foamy texture with air entrapped in it. When air is released from the adhesive, the final volume of adhesive remaining on the sheet is less than the amount calibrated through the slot die. Also, when air is released from the surface of the adhesive, it promotes a faster drying of the surface. Consequently, the wetness of the adhesive applied to a food-seasoning sheet also depends on the air content in the adhesive exiting the slot die. Similarly, the free moisture present in the adhesive tends to dissolve the food-seasoning ingredients into the adhesive and/or into one another and to reduce the potency of the seasoning ingredients.

Because of these factors, basically, it has been difficult in the past to precisely calibrated the amount of adhesive delivered onto a food-seasoning sheet. Therefore, there exists a need for precisely controlling the amount of adhesive that is laid on a food-seasoning sheet and there also exists a need for controlling the amount of air and free moisture present in that adhesive.

SUMMARY OF THE INVENTION

In the present invention, there is provided an installation for dispensing adhesive onto a moving base sheet, wherein the amount of adhesive laid on a base sheet is precisely calibrated in a very thin layer. Air and free moisture are removed from the adhesive before the adhesive is dispensed onto the base sheet. The adhesive is in a more favourable state for receiving food-seasoning products thereon.

In a first aspect of the present invention, there is provided a method for preventing a dissolution of food-seasoning ingredients into the adhesive. This method comprises the steps of
   laying a thin layer of adhesive on a base sheet;
   removing air from the adhesive prior to the step of laying;
   reducing free moisture from the adhesive during the step of laying, and
   depositing food-seasoning ingredients onto the layer of adhesive.

The removing of air and free moisture from the adhesive has been devised primarily for obtaining a better dispensing of the adhesive on a base sheet. Because the adhesive that is used in the method according to the present invention has less air entrapped in it and contains less free moisture, this adhesive can be applied in very thin layers and can be applied with clean edges and clean breaks.

In addition to making the adhesive easy to apply on a base sheet, i.e. clean edges and clean breaks, a new and unexpected advantage has been obtained. It is believed that because of the low water activity and the extremely thin application of the adhesive, there is minimal (if any) dissolving of potentially soluble food-seasoning ingredients into the adhesive and/or into one another. The low water activity means that there is little free water available to dissolve anything. The thin application and the scarcity of air speed up the drying process to further reduce free moisture. As a result of minimal dissolving, there is nothing to diminish, mask or alter the seasoning flavour profile selected. The flavour profiles desired are more easily obtained and preserved. The flavour profiles desired are more precisely duplicated from one order to the next.

In another aspect of the present invention, there is provided an installation for manufacturing food-seasoning sheets having a layer of adhesive laid onto on a base sheet and food-seasoning ingredients bonded to the layer of adhesive. This installation includes a first reservoir for making liquid adhesive therein. The installation also has a liquid adhesive dispenser having a slot die and a second reservoir in the slot die for receiving the liquid adhesive from the first reservoir; and a delivery slot in the slot die communicating with the second reservoir for dispensing the liquid adhesive onto the base sheet. There is also provided a pump and a piping system for pumping the liquid adhesive from the first reservoir to the second reservoir in an air free environment. A spice dispenser is included for dispensing spice product over the liquid adhesive on the base sheet. In this installation, the first reservoir has a mixer and a vacuum pump connected to it for generating a partial vacuum in the first reservoir when the first reservoir contains the liquid adhesive, and for removing air from the liquid adhesive prior to delivering the liquid adhesive to the second reservoir. As a result, the liquid adhesive laid on the base sheet has less air entrapped in it such that it is more easily applied in a very thin layer.

In yet another aspect of the installation according to the present invention, there is provided a heating element mounted in or to the slot die for heating the adhesive as it is dispensed onto the base sheet. The heating of the adhesive promotes the evaporation of free moisture from the adhesive and the release of air entrapped in the adhesive. The adhesive is easily applied in thin layers with clean edges and breaks.

In yet a further aspect of the installation according to the present invention, there is provided a vacuum box mounted under the delivery slot of the slot die for removing air from the base sheet and from the adhesive when the adhesive is laid on the base sheet.

In yet another aspect of the installation according to the present invention, there is provided a system for winding the base sheet after spice products have been dispensed on it, and a monitoring and control system for setting and controlling a tension in the base sheet during a winding of the base sheet, for preventing damage to the food-seasoning sheets during storage and transport to a client.

In yet a further aspect of the installation according to the present invention, a template is mounted in the slot die. The template has a dado edge extending in the delivery slot for locally obstructing a flow of adhesive through the delivery slot and for creating margins free of adhesive on the base sheet.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which.

DESCRIPTION OF THE PREFERRED EMBODIMENT

Figure 1:
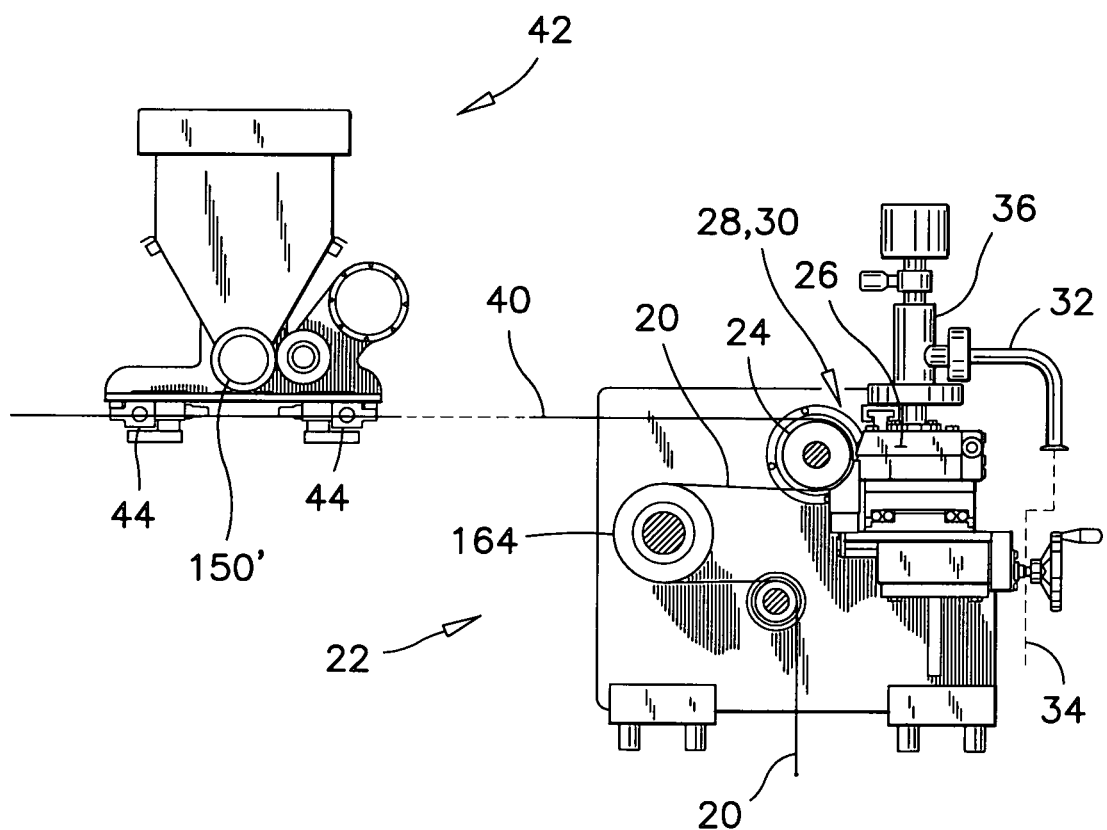
FIG. 1 is a schematic representation of an adhesive dispenser and a spice dispenser in an installation for manufacturing food-seasoning sheets.

Referring firstly to FIG. 1, the manufacturing of a food-seasoning sheets in the installation according to the preferred embodiment will be explained in a general manner. As a base, a film 20 of plastic material is supplied to the adhesive dispenser 22 from a roll of film for example (not shown). The film 20 can be made of polyethylene for example or other sheet material, but this is not the focus of the present invention.

The film 20 is wrapped over a slot die mandrel 24 which is mounted close to a slot die 26. The slot die 26 has a delivery slot 28 facing the slot die mandrel 24. The film 20 passes in a small gap 30 between the delivery slot 28 of the slot die 26 and the slot die mandrel 24.

Adhesive is delivered under pressure from a reservoir (described later) to the slot die 26, via the inlet tubing 32. The inlet tubing 32 has a connection to a piping system represented by a dash line 34. The adhesive is pumped through the body of a pull-back valve 36 and into the slot die 26. The operation of the pull-back valve 36 and the slot die 26 will also be described later.

The adhesive-covered sheet 40 is then passed under a spice dispenser 42 where a calibrated amount of spice product is delivered on the top of the sheet. The spice product is delivered over the wet adhesive, to bond to the adhesive. The spice dispenser 42 is located at a minimum distance from the adhesive dispenser 22 to minimize the drying of the adhesive prior to dispensing the spice product on the sheet 40. The spice-covered sheet is then allowed to dry on the run to a winder (not shown), where it is wound on a storage roll.

Although the words "spice" and "spice product" are used herein, these words are used for convenience only and should not be limiting in the interpretation of the present invention. The spice dispenser 42 may be used to deliver granular food products, salt, pepper, sugar, chocolate, nuts, fruits, spices, preservatives, seasoning formulations, anti-microbial compositions, medicinal products or any combination of these substances, or any product of that nature.

The operation of the spice dispenser 42 is not described in detail herein because it is not the focus of the present invention. In the preferred installation, the calibration of the amount of spice product delivered per unit of surface of film 40 over time is done by weight and this is controlled by computer and load cells 44 mounted under the base of the spice dispenser 42, and a speed sensor (described later) reading the speed of the slot die mandrel 24 on the adhesive dispenser 22 for example.

Figure 2:
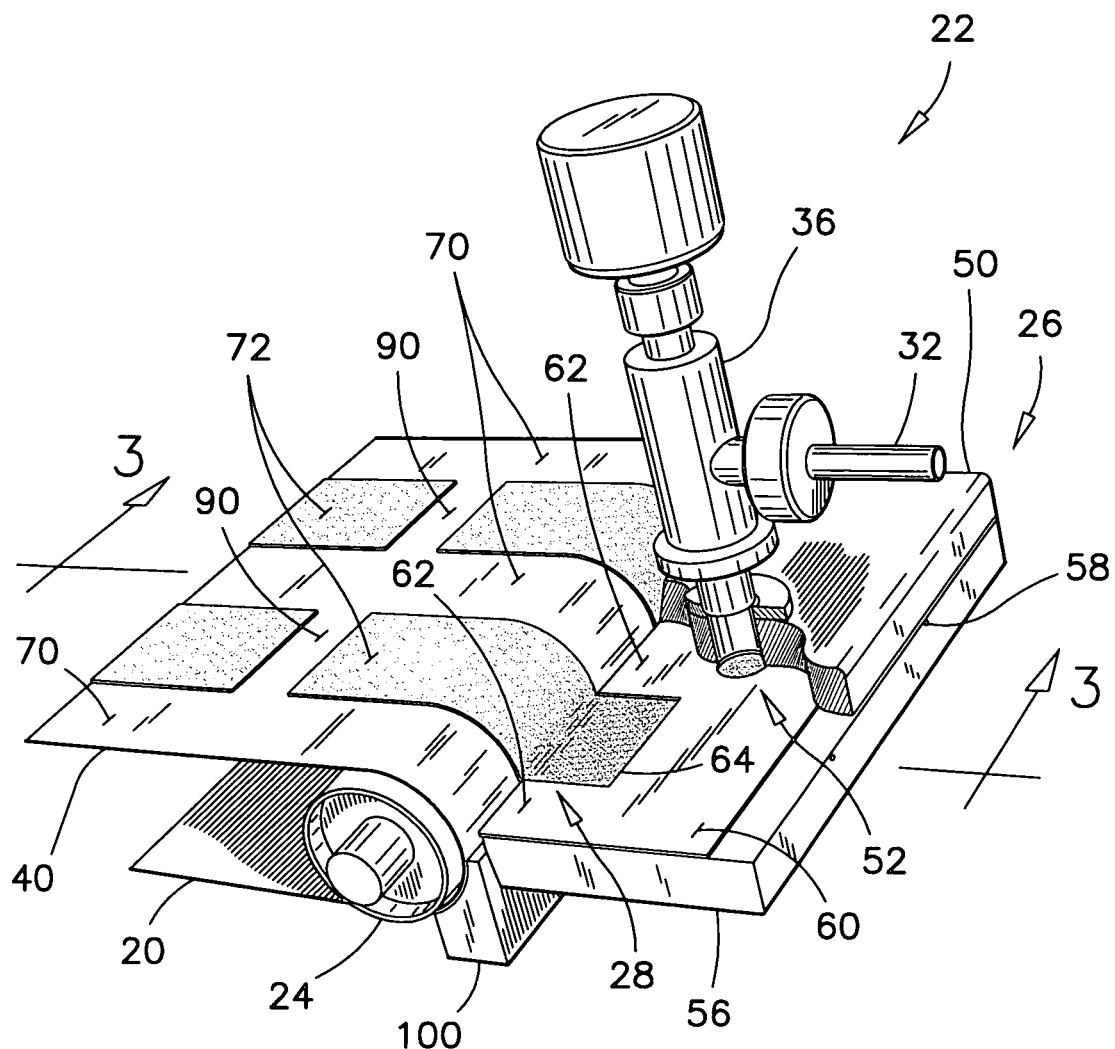
FIG. 2 is a cutaway perspective view of the slot die in the adhesive dispenser.
Figure 3:
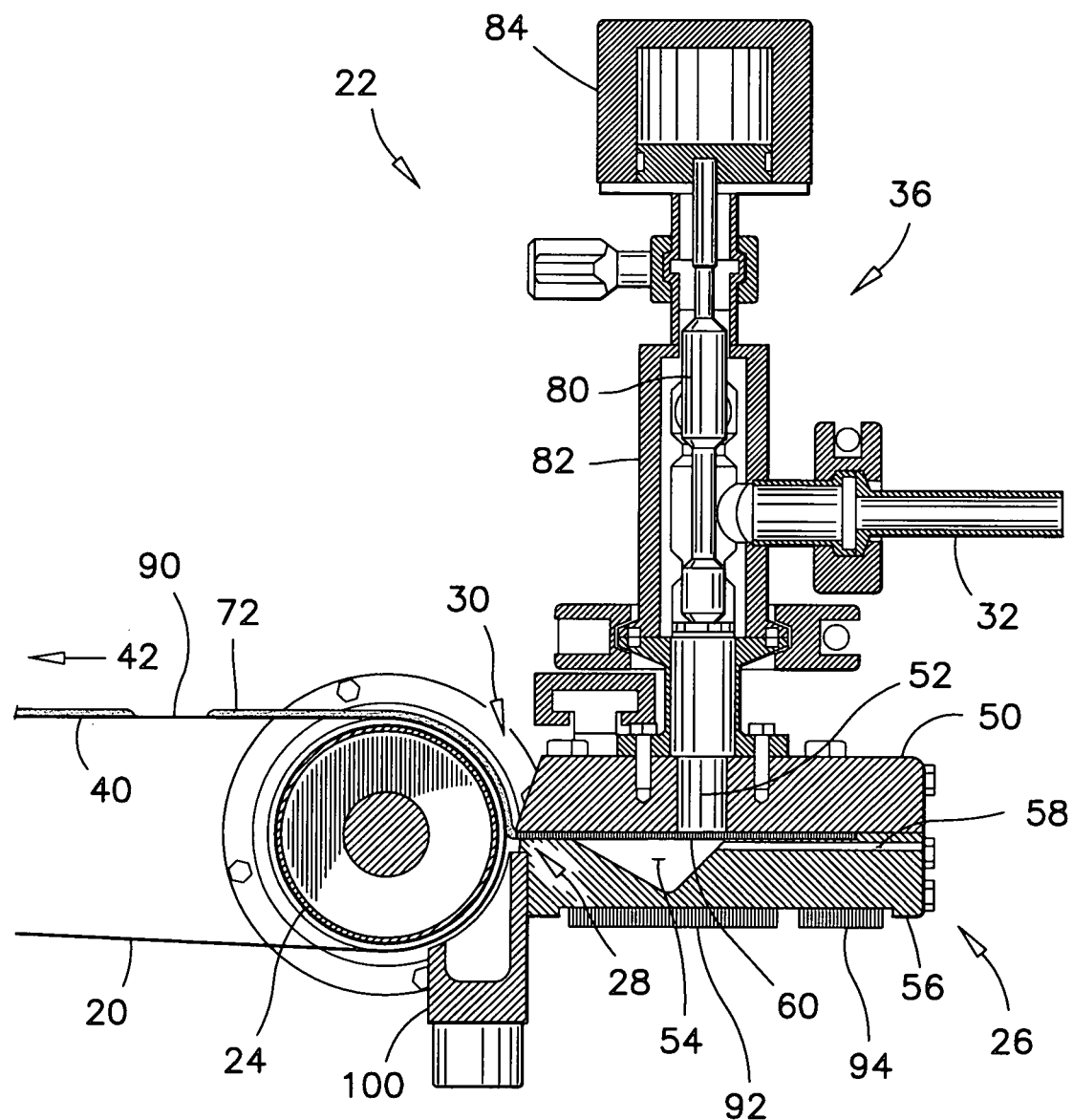
FIG. 3 is a cross-section view of the slot die as seen substantially along lines 3-3 in FIG. 2.

Referring now to FIGS. 2 and 3, the structure and operation of the adhesive dispenser 22 will be described. In FIG. 2, the slot die 26 is shown with its top half 50 in a cutaway view. The pull-back valve 36 is connected to an opening 52 in the top half 50. This opening 52 communicates with a reservoir 54 in the bottom half 56 of the slot die 26. The reservoir 54 can be seen in the cross-section view of the slot die 26 in FIG. 3. The reservoir 54 communicates with the delivery slot 28.

The reservoir 54 further has two vent holes 58 along a top portion thereof to evacuate air entrapped in it. The vent holes 58 have a dimension to allow air to escape out, but to restrict the flow of adhesive there through.

A flat template 60 is mounted between the top and bottom halves 50, 56 of the slot die 26 and over the reservoir 54. The thickness of the template 60 is a same thickness as the gap of the delivery slot 28 in the slot die 26. The template 60 has a dado edge with fingers 62 and recesses 64. The fingers 62 block portions of the slot 28 of the die while the recesses 64 allow adhesive to flow though other portions of the slot 28 of the die. The local blocking of the slot 28 of the slot die 26 at the fingers 62 causes the formation of clean margins 70 along the adhesive-covered sheet 40 so as to define strips 72 of adhesive on the adhesive-covered sheet 40, and margins 70 free of adhesive.

The operation of the pull-back valve 36 creates a partial vacuum in the reservoir 54 and pulls back the adhesive upward in the conduit 52. The pull-back valve 36 comprises a spool 80 that is movable in a valve body 82, under the action of a pneumatic actuator 84. The details of the spool 80, the valve body 82 and the actuator 84 are not provided herein because these details are not the focus of the present invention and are known to those skilled in the art. The valve 36 is basically a two-way valve.

The operation of the pull-back valve 36 causes interruptions in the flow of adhesive through the slot 28 of the slot die 26. The operation of the pull-back valve 36 creates interruptions in the delivery of adhesive to the adhesive-covered sheet 40 when the sheet 20 is moving in front of the delivery slot 28, thereby causing breaks 90 in the strips of adhesive 72.

The slot die 26 is separable in two halves 50, 56 and the template 60 is removably mounted between both halves. Different templates 60 may be used with different dado edges to define more or less margins 70 and margin widths. The operation of the pull-back valve 36 may be controlled by a timer and a programmable controller or other computer to vary the frequency and length of the breaks 90.

These clean margins 70 and breaks 90 free of adhesive are useful for manufacturing foldable food-seasoning sheet products such as envelopes and bags for examples. The clean margins and breaks provide clean surfaces that can be bonded to each other using heat-sealing equipment for example.

The stroke length of the spool 80 of the pull-back valve 36 is selected so that air does not get into the reservoir 54. The stroke length is selected to break the flow of adhesive through the slot 28 of the die 26, without introducing air in the slot 28.

The movement of the valve spool 80 of the pull-back valve 36 and of the resulting movement of the adhesive inside the reservoir 54 associated with the partial vacuum that is created inside the reservoir 54 causes a certain amount of air to be released from the adhesive inside the reservoir 54 and to be evacuated through the vent holes 58.

A heating element 92 and a thermocouple 94 are mounted in or to the slot die 26. The exact location of the heating element and the thermocouple can vary from the illustration in FIG. 3, according to the choice of the designer. This heating element 92 and thermocouple 94 are used to control the temperature of the adhesive exiting the slot die 26. It has been found that a controlled heating of the adhesive prior to delivery through the slot die 26 improve trailing edge quality and uniformity in the adhesive layer. It also has been found that a heating of the adhesive helps to release air entrapped in the adhesive and from the reservoir 54. It has further been found that the heating of the adhesive helps to reduce free moisture in the adhesive being delivered onto the film 20. Reduced amounts of air and free moisture in the adhesive have been found to yield a better quality food-seasoning sheets with less dissolving of the food-seasoning ingredients.

Figure 5:
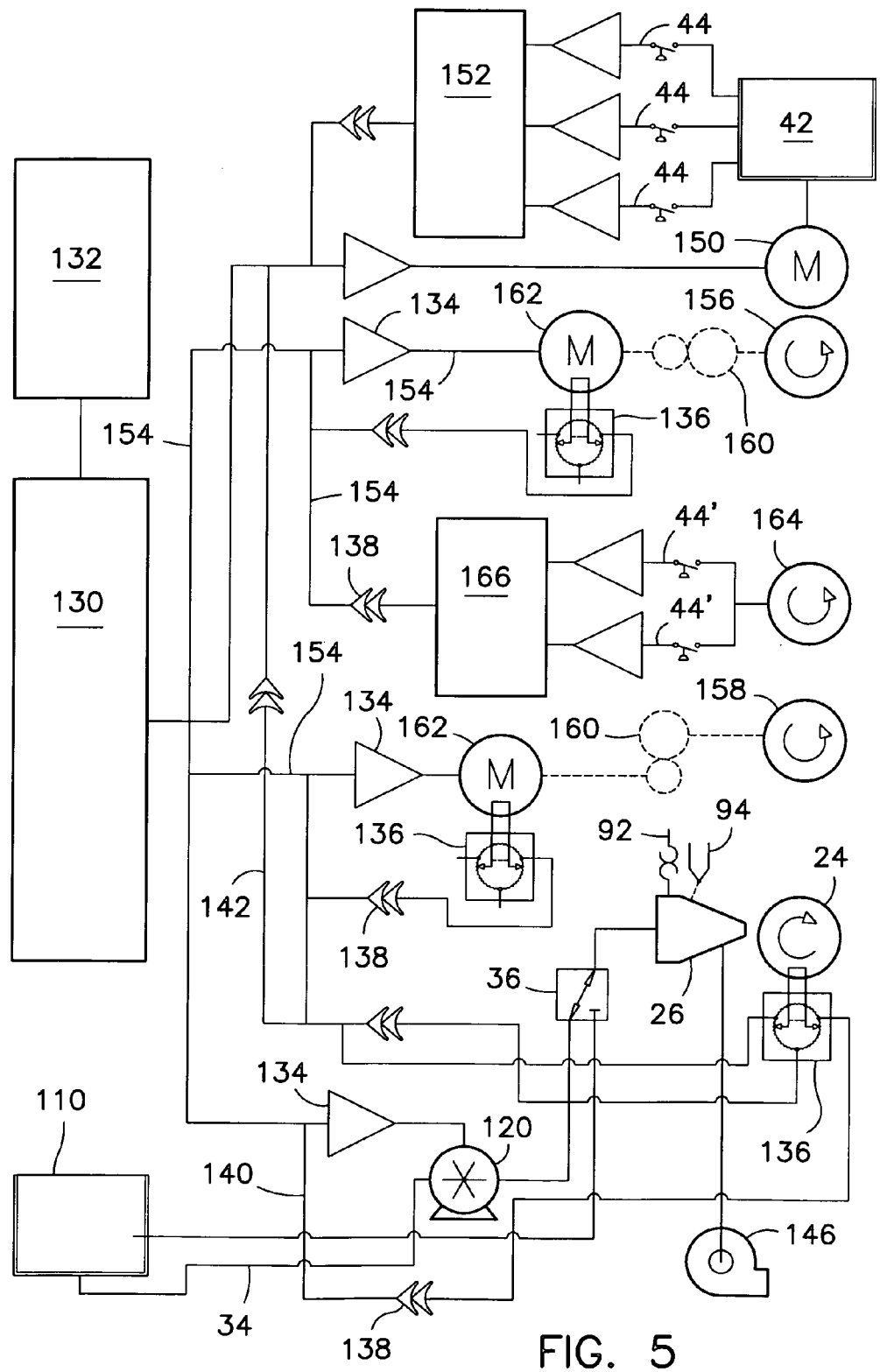
FIG. 5 is a block diagram of the operation and control equipment included in the installation for manufacturing food-seasoning sheets.

A vacuum box 100 is also provided immediately under the gap 30 and the delivery slot 28. The vacuum box 100 is open at the top as can be seen in FIG. 3, with an opening facing the surface of the slot die mandrel 24 immediately below the delivery slot 28. A partial vacuum is applied into the box 100 by a vacuum pump 146 as illustrated in FIG. 5 for example, and an air flow is drawn therein from the surface of the slot die mandrel 24, to remove air from the surface of film 20 immediately before adhesive is deposited to the film 20. As may be appreciated, the vacuum box also has the ability to remove air from the lower laminae of adhesive exiting the slot 28 of the die.

The removal of air from the film 20 and from the lower laminae of adhesive ensures that less air is be trapped under and into the adhesive. As may be appreciated, this removal of air reduces the amount of air permeating through the layer of adhesive on the adhesive-covered sheet 40.

Figure 4:
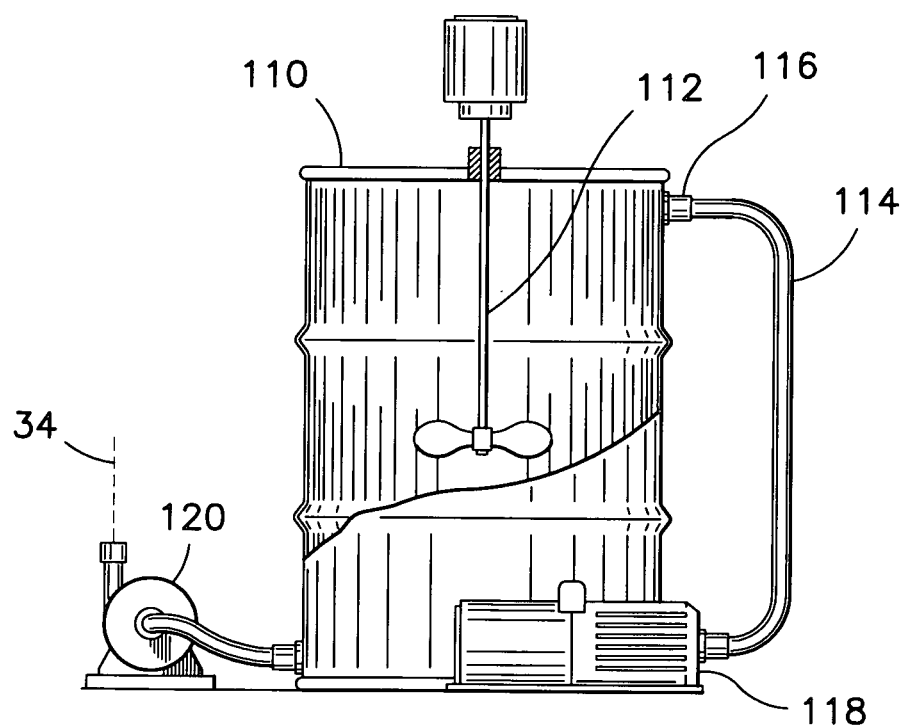
FIG. 4 is a cutaway view of a reservoir for making adhesive to be delivered to the adhesive dispenser of FIGS. 2 and 3.

Referring now to FIG. 4, there is illustrated therein a reservoir 110 for making and mixing a batch of adhesive, for use in the slot die 26. The adhesive is pumped from the reservoir 110 though the piping system 34 shown in FIG. 1. The reservoir 110 is of a type that can be hermetically sealed. The reservoir 110 has a mixer 112 mounted therein. The reservoir 110 also has a tubing 114 connected to a top part thereof at connection 116 for example. The tubing 114 is connected to a vacuum pump 118.

In use, a batch of adhesive is prepared and mixed under at least a partial vacuum so that a minimum amount of air is entrapped in the adhesive. The adhesive is transferred to the slot die 26 and enters the slot die 26 under pressure from a pump 120 and tubing 34. Both the pump 120 and tubing 34 are hermetically sealed as it is customary with equipment of that nature. The adhesive being pumped is not exposed to air between the reservoir 110 and the slot die 26.

Referring now to FIG. 5, there is illustrated therein a block diagram of the equipment included in the preferred installation for manufacturing food-seasoning sheets. The installation is controlled by a programmable logic controller (PLC) 130 with motion controllers. A touch-screen input device 132 is used to enter settings for different food-seasoning profiles.

Servo drives 134, encoders 136 and feedback loops 138 are used for controlling the speed of each function driver.

Referring to individual function drivers, the adhesive delivery pump 120 is connected to the adhesive reservoir 110. The reservoir 110 as shown in FIG. 5 is a same reservoir as the mixing reservoir shown in FIG. 4. However, in some installations, two reservoirs may be used; one for batch mixing the adhesive and one for delivering the adhesive to the slot die 26 in a continuous mode.

The adhesive delivery pump 120 is a volume-controllable pump and its delivery volume is controlled in relation to film speed measured at slot die mandrel 24, in a control feedback loop 140. The adhesive delivery pump 120 is programmable to set precise coat weight or thickness.

The delivery of spice product from the spice hopper 42 to the web is also controlled in relation with the speed of the slot die mandrel 24, by means of a feedback loop 142 between the spice delivery mandrel 150 and the slot die mandrel 24.

The spice application is based on a loss-of-weight feeding system, including load cells 44 under the spice hopper 42, and a first summing module 152 reading the load cells 44. The speed of the servo motor 150 on the spice mandrel 150' is controlled by weight loss over film speed and recipe request. The location of the spice mandrel 150' can be seen in FIG. 1.

The film speed and film tension are controlled through a feedback loop 154 between a web-unwind roll 156 and a web rewind roll 158. Each of the film unwind roll 156 and film rewind roll 158 is driven by a gear box 160 and a servo motor 162.

The film speed and film tension are also controlled by measurement of the radial strain on a tension roll 164. The tension roll 164 can also be seen in FIG. 1. A pair of load cells 44' are installed on the tension roll 164 to measure film tension. The signals from these load cells 44' are integrated in a second summing module 166, and are used to adjust speed and torque of both the film unwind roll 156 and film rewind roll 158. Torque is recipe-dependent and is controlled especially for preventing product damage on roll-up of the coated film 40.

The installation according to the preferred embodiment for manufacturing food-seasoning sheets has the ability to precisely control the thickness of the adhesive layer and the volume of food-seasoning ingredients deposited on the film surface. The preferred installation also has the ability to control film tension at roll-up. Further, the preferred installation has the ability to control free moisture and air content in the adhesive. As a result, a better calibration of the food-seasoning ingredients is obtained.

The preferred installation has limited absorption of the food-seasoning elements into the adhesive or vice-versa, or into one another. The food-seasoning elements keep their maximum potency.

As to other manner of usage and operation of the manufacturing of food-seasoning sheets, the same should be apparent from the above description and accompanying drawings, and accordingly, further discussion relative to these aspects is deemed unnecessary.

What is claimed is:

1. In a manufacturing of a food-seasoning sheet comprising a base sheet, a layer of adhesive laid on said base sheet and food-seasoning ingredients bonded to said layer of adhesive, the method of preventing a dissolution of said food-seasoning ingredients into said adhesive, comprising the steps of:

receiving a volume of said adhesive in a slot die;

heating said volume of said adhesive and removing air and free moisture from said volume of said adhesive;

laying a thin layer of said adhesive on said base sheet; and depositing food-seasoning ingredients onto said layer of said adhesive.

2. The method as claimed in claim 1, wherein said step of removing air from said adhesive comprises the steps of:

removing air from said adhesive during a making of said adhesive in a first location, and pumping said adhesive to an adhesive dispenser in an air free environment to a second location different from said first location.

3. The method as claimed in claim 1, wherein said step of laying comprises the step of controlling a volume of said adhesive according to a speed of said base sheet when said adhesive is delivered to said base sheet.

4. The method as claimed in claim 3, further comprising the step of removing air from said adhesive and from said base sheet when said adhesive is delivered to said base sheet.

5. The method as claimed in claim 4, further including the step of periodically creating a partial vacuum in said slot die.

* * * * *